United States Patent
Yeh et al.

(10) Patent No.: US 12,549,414 B2
(45) Date of Patent: Feb. 10, 2026

(54) SIGNAL TRANSMISSION DEVICE

(71) Applicant: REALTEK SEMICONDUCTOR CORPORATION, Hsinchu (TW)

(72) Inventors: Chih-Yuan Yeh, Hsinchu (TW); Huan-Chun Li, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 349 days.

(21) Appl. No.: 18/367,661

(22) Filed: Sep. 13, 2023

(65) Prior Publication Data
US 2024/0097945 A1  Mar. 21, 2024

(30) Foreign Application Priority Data
Sep. 19, 2022 (TW) .................................. 111135359

(51) Int. Cl.
*H04L 25/02* (2006.01)
*H03K 17/687* (2006.01)
*H03K 19/0185* (2006.01)

(52) U.S. Cl.
CPC ..... *H04L 25/0272* (2013.01); *H03K 17/6872* (2013.01); *H03K 19/018528* (2013.01); *H04L 25/028* (2013.01)

(58) Field of Classification Search
CPC .................... H04L 25/0272; H04L 25/0258
See application file for complete search history.

(56) References Cited

U.S. PATENT DOCUMENTS

2012/0013220 A1* 1/2012 Kawata ............... B06B 1/06
                                                           310/317
2012/0081821 A1* 4/2012 Li ........................ H02H 9/046
                                                           361/56

(Continued)

OTHER PUBLICATIONS

2) OA letter of a counterpart TW application (appl. No. 111135359) mailed on 2023/08/04.3) Summary of the TW OA etter issued according to the TW counterpart application:(1) Claims 1-7 and 9 are rejected as being unpatentable over the cited reference 1 (US 2014/0028356 A1).P.S. Correspondence between the claims of the TW counterpart application and the claims of the present US application:(1) Claims 1-2, 3-5, and 6-10 of the TW counterpart application are corresponding to the claims 1-2, 5-7, and 13-17 of the present US application respectively.

(Continued)

*Primary Examiner* — Zhiren Qin
(74) *Attorney, Agent, or Firm* — WPAT, PC

(57) ABSTRACT

A signal transmission device has an initial signal stabilization mechanism and includes a driver and a bypass circuit. The driver includes: a first current source circuit coupled between a high voltage terminal and a first node; a second current source circuit coupled between a low voltage terminal and a second node; and a driving circuit coupled between the first node and the second node. The driving circuit outputs an output signal according to a first bias voltage of the first node, a second bias voltage of the second node, and an input signal during a signal output operation. The bypass circuit is coupled between the first node and the second node. In the beginning of the signal output operation, the bypass circuit conducts a current from the first node to the second node to assist in establishing the first and second bias voltages and thereby stabilize the output signal.

17 Claims, 4 Drawing Sheets

(56) References Cited

U.S. PATENT DOCUMENTS

| | | | |
|---|---|---|---|
| 2012/0200338 A1* | 8/2012 | Olson | H03K 17/145 |
| | | | 327/534 |
| 2014/0028356 A1 | 1/2014 | Knoedgen | |
| 2016/0036388 A1* | 2/2016 | Xu | H03F 1/0266 |
| | | | 330/296 |
| 2021/0327239 A1* | 10/2021 | Falkenburg | G01N 21/17 |
| 2024/0097945 A1* | 3/2024 | Yeh | H03K 17/6872 |
| 2025/0061926 A1* | 2/2025 | Yachareni | G11C 7/20 |

OTHER PUBLICATIONS

Taiwan Application No. 111127845 "Signal Generating Circuit" (TIPO receipt date: Jul. 25, 2022), Taiwan.

* cited by examiner

SIGNAL TRANSMISSION DEVICE

BACKGROUND OF THE INVENTION

1. Field of the Invention

The present disclosure relates to a signal transmission device, especially to a signal transmission device having a stabilization mechanism for stabilizing the initial output of an output signal.

2. Description of Related Art

When a conventional signal transmitter changes its state machine to enter a transmission mode, the signal transmitter transmits a specific signal (e.g., a low frequency periodic signal (LFPS)) to a signal receiver to let the signal receiver identify the specific signal and operate accordingly. However, when the signal transmitter starts transmitting the specific signal, the initial output of the specific signal is unstable, which may cause the signal receiver to misjudge the specific signal and to incorrectly respond to the signal transmitter; consequently, the signal transmitter may not receive a correct response from the signal receiver, and the state machine of the signal transmitter may not enter a correct mode.

SUMMARY OF THE INVENTION

An object of the present disclosure is to provide a signal transmission device as an improvement over the prior art.

An embodiment of the signal transmission device of the present disclosure has a stabilization mechanism for stabilizing the initial output of an output signal. This embodiment includes a driver and a bypass circuit. The driver includes a first current source circuit, a second current source circuit, and a driving circuit. The first current source circuit is coupled between a high voltage terminal and a first node; the second current source circuit is coupled between a low voltage terminal and a second node; and the driving circuit is coupled between the first node and the second node, wherein the driving circuit is configured to output the output signal according to a first bias voltage of the first node, a second bias voltage of the second node, and an input signal during a signal output operation which starts before the driving circuit outputs the output signal. The bypass circuit is coupled between the first node and the second node and coupled with the driving circuit in parallel. After the signal transmission device starts the signal output operation and before the driving circuit outputs the output signal, the bypass circuit is configured to be turned on to conduct a current from the first node to the second node and thereby assist in establishing the first bias voltage and the second bias voltage for the signal output operation, which allows the driving circuit to stabilize the initial output of the output signal when the driving circuit starts outputting the output signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a signal transmission device having a stabilization mechanism for stabilizing the initial output of an output signal (e.g., a low frequency periodic signal (LFPS)).

Figure 1:
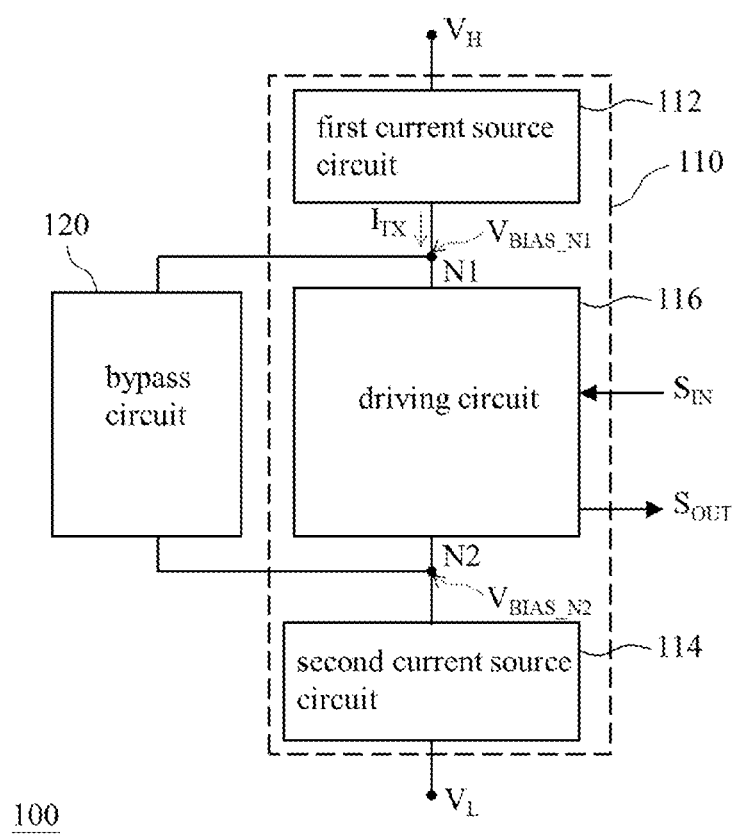
FIG. 1 shows an embodiment of the signal transmission device of the present disclosure.

FIG. 1 shows an embodiment of the signal transmission device of the present disclosure. The signal transmission device of FIG. 1 includes a driver 110 and a bypass circuit 120. These circuits are described in the following paragraphs, respectively.

Please refer to FIG. 1. The driver 110 includes a first current source circuit 112, a second current source circuit 114, and a driving circuit 116. The first current source circuit 112 is coupled between a high voltage terminal $V_H$ (e.g., a voltage supply terminal $V_{DD}$) and a first node N1. The second current source circuit 114 is coupled between a low voltage terminal $V_L$ (e.g., a ground terminal GND) and a second node N2. The driving circuit 116 is coupled between the first node N1 and the second node N2. The driving circuit 116 is configured to output an output signal $S_{OUT}$ according to a first bias voltage $V_{BIAS\_N1}$ of the first node N1, a second bias voltage $V_{BIAS\_N2}$ of the second node N2, and an input signal $S_{IN}$ during a signal output operation.

Please refer to FIG. 1. The bypass circuit 120 is coupled between the first node N1 and the second node N2, and is coupled with the driving circuit 110 in parallel. After the signal transmission device 100 starts the signal output operation and before the driving circuit 116 outputs the output signal $S_{OUT}$, the bypass circuit 120 is turned on to conduct a current $I_{TX}$ from the first node N1 to the second node N2 and thereby assist in establishing the first bias voltage $V_{BIAS\_N1}$ and the second bias voltage $V_{BIAS\_N2}$ for the signal output operation, which allows the driving circuit 116 to stably output the output signal $S_{OUT}$ in the beginning of the driving circuit 116 outputting the output signal $S_{OUT}$. For example, the bypass circuit 120 includes M bypass path(s); each of the M bypass path(s) is coupled between the first node N1 and the second node N2, and is configured to conduct the current $I_{TX}$ from the first node N1 to the second node N2, wherein the M is a positive integer; and when the M is greater than one, the M bypass paths are coupled in parallel. It is noted that before the signal transmission device 100 starts the signal output operation and after the driving circuit 116 outputs the output signal $S_{OUT}$, the bypass circuit 120 can optionally be turned off to save power, but the implementation of the present invention is not limited thereto. The conduction state of the bypass circuit 120 can be controlled by a switch signal mentioned in a later paragraph.

Figure 2:
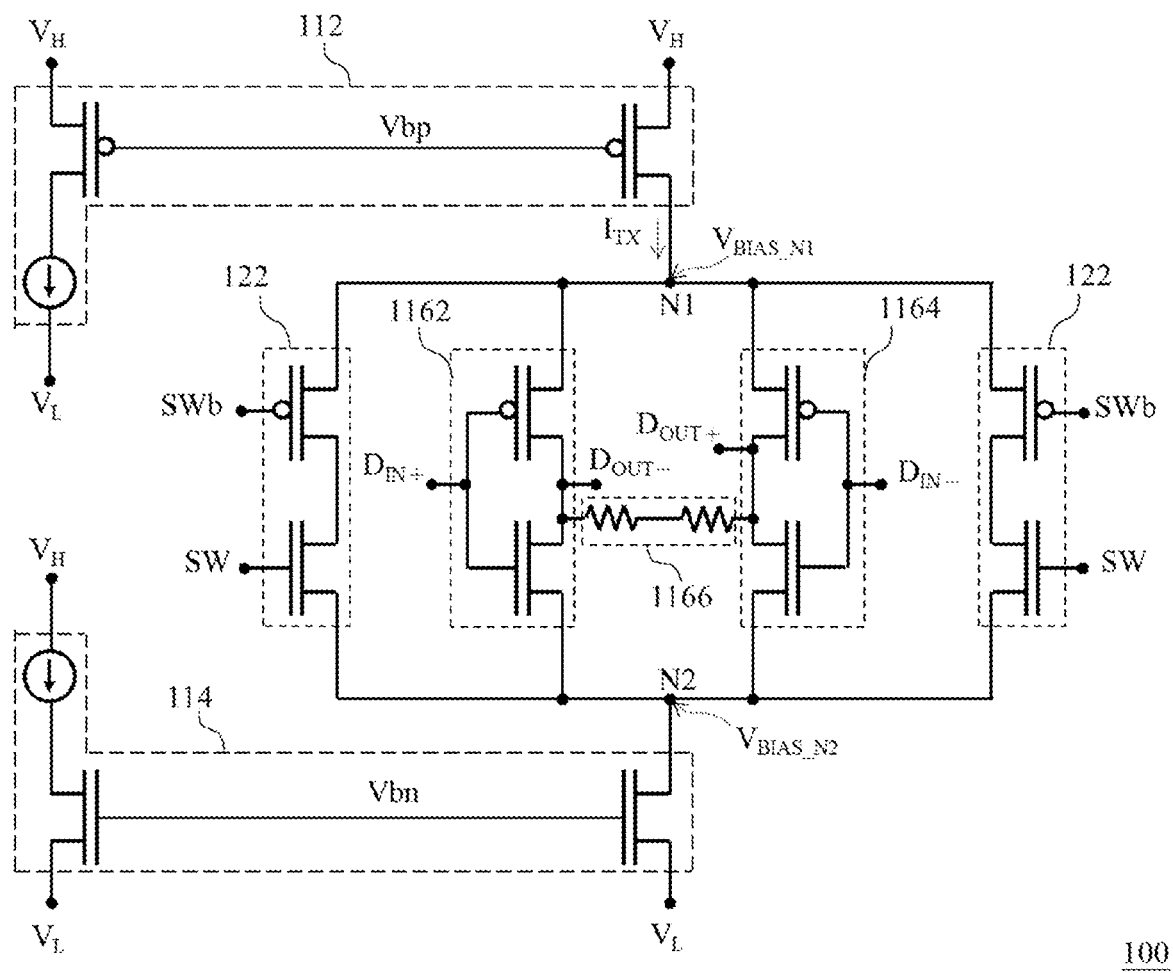
FIG. 2 shows an exemplary implementation of the signal transmission device of FIG. 1.

FIG. 2 shows an exemplary implementation of the signal transmission device 100 of FIG. 1. Please refer to FIGS. 1-2. Both the first current source circuit 112 and the second current source circuit 114 are current mirrors whose configuration and operation are well known in this technical field and are not described in detail here. As shown in FIGS. 1-2, the input signal $S_{IN}$ is a differential input signal including a first input signal $D_{IN+}$ and a second input signal $D_{IN-}$ that are complementary signals; the output signal $S_{OUT}$ is a differential output signal including a first output signal $D_{OUT+}$ and a second output signal $D_{OUT-}$ that are complementary signals; the driving circuit 116 includes a first inverting circuit 1162, a second inverting circuit 1164, and a resistance circuit 1166. The first inverting circuit 1162 is configured to receive the first input signal $D_{IN+}$ at a first input terminal and to output the second output signal $D_{OUT-}$ at a first output terminal. The second inverting circuit 1164 is configured receive the second input signal $D_{IN-}$ at a second input terminal and to output the first output signal $D_{OUT+}$ at a second output terminal. The resistance circuit 1166 is coupled between the first output terminal and the second output terminal, and includes two resistors coupled in series.

Please refer to FIGS. 1-2. Before the signal transmission device 100 starts the signal output operation, the first current source circuit 112 closes a first current path between the high voltage terminal $V_H$ and the first node N1 to conduct no current (or insignificant/negligible current) from the high voltage terminal $V_H$ to the first node N1; before the signal transmission device 100 starts the signal output operation, the second current source circuit 114 closes a second current path between the low voltage terminal $V_L$ and the second node N2 to conduct no current (or insignificant/negligible current) from the second node N2 to the low voltage terminal $V_L$; after the signal transmission device 100 starts the signal output operation, the first current source circuit 112 opens the first current path to conduct significant current from the high voltage terminal $V_H$ to the first node N1; and after the signal transmission device starts the signal output operation, the second current source circuit 114 opens the second current path to conduct significant current from the second node N2 to the low voltage terminal $V_L$. The conduction states of the first current source circuit 112 and the second current source circuit 114 can be controlled through the control over a gate voltage Vbp of the first current source circuit 112 and the control over a gate voltage Vbn of the second current source circuit 114 as shown in FIG. 2.

Please refer to FIGS. 1-2. The bypass circuit includes two bypass paths 122. Each of the bypass paths 122 is coupled between the first node N1 and the second node N2, and includes a first switch and a second switch coupled in series. The first switch is turned on or turned off according to a switch signal SW while the second switch is turned on or turned off according to the inversion SWb of the switch signal SW. It is noted that the first switch is a n-channel metal oxide semiconductor (NMOS) transistor and the second switch is a p-channel metal oxide semiconductor (PMOS) transistor in FIG. 2, but the implementation of the present invention is not limited thereto. In an alternative embodiment, each bypass path 122 includes one and only switch (e.g., one single NMOS transistor or one single PMOS transistor), or includes a plurality of similar switches (e.g., a plurality of NMOS transistors or a plurality of PMOS transistors).

Please refer to FIG. 1. In an exemplary implementation of this embodiment, the signal transmission device 100 is included in a system (not shown in FIG. 1). The system sends a beacon BCN (not shown in FIG. 1) to the signal transmission device 100, and the signal transmission device 100 is configured to start the signal output operation according to the beacon BCN, wherein the signal transmission device 100 is operable to determine a signal output period according to the beacon BCN. The bypass circuit 120 is configured to be turned on during a specific period. The specific period starts after the signal transmission device 100 receives the beacon BCN and ends before the signal output period starts.

Figure 3:
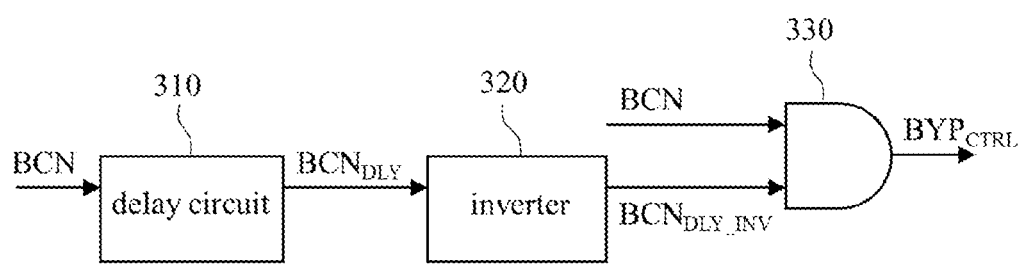
FIG. 3 shows an example of a bypass control circuit included in the signal transmission device of FIG. 1.

In an exemplary implementation of the embodiment of FIG. 1, the aforementioned specific period is predetermined duration starting from a time point of the signal transmission device 100 receiving the beacon BCN. The predetermined duration is fixed or adjustable, and can be determined according to the demand for implementation. For example, the signal transmission device 100 further includes a bypass control circuit 300 as shown in FIG. 3. The bypass control circuit 300 includes a delay circuit 310, an inverter 320, and an AND gate 330. The delay circuit 310 is configured to delay the beacon BCN for the predetermined duration to generate an output-period control signal $BCN_{DLY}$. The output-period control signal $BCN_{DLY}$ determines the signal output period; for example, the duration of the output-period control signal $BCN_{DLY}$ staying at a high level defines the signal output period. The inverter 320 is configured to generate the inversion $BCN_{DLY\_INV}$ of the output-period control signal $BCN_{DLY}$. The AND gate 330 is configured to generate a bypass control signal $BYP_{CTRL}$ (e.g., the switch signal SW in FIG. 2) according to the beacon BCN and the inversion $BCN_{DLY\_INV}$. The bypass control signal $BYP_{CTRL}$ is used for controlling the conduction state of the bypass circuit 120.

Figure 4:
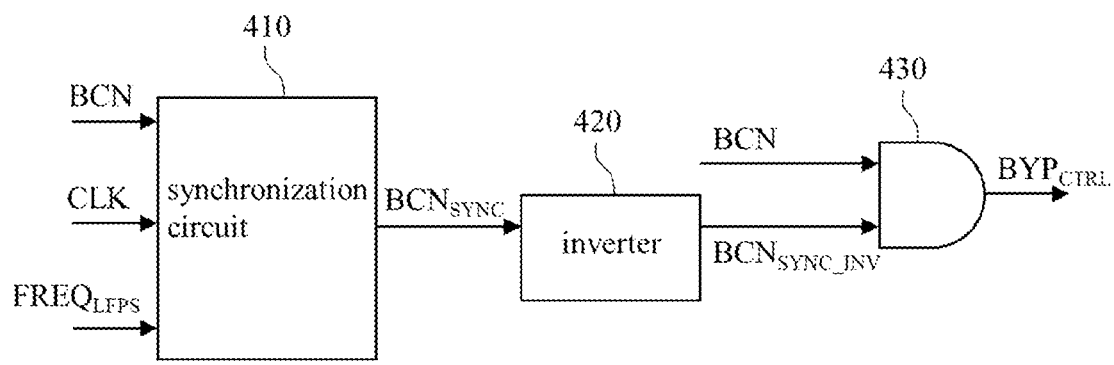
FIG. 4 shows another example of a bypass control circuit included in the signal transmission device of FIG. 1.

In an exemplary implementation of the embodiment of FIG. 1, the signal transmission device 100 receives the beacon BCN at a first time point, the signal output period starts at a second time point, and the aforementioned specific period is between the first time point and the second time point. For example, the signal transmission device 100 further includes a bypass control circuit 400 as shown in FIG. 4. The bypass control circuit 400 includes a synchronization circuit 410, an inverter 420, and an AND gate 430. The synchronization circuit 410 is configured to generate an output-period control signal $BCN_{SYNC}$ according to the beacon BCN, a clock signal CLK, and a predetermined frequency $FREQ_{LFPS}$ of the output signal $S_{OUT}$. The output-period control signal $BCN_{SYNC}$ determines the signal output period; for example, the duration of the output-period control signal $BCN_{SYNC}$ staying at a high level defines the signal output period. The inverter 420 is configured to generate the inversion $BCN_{SYNC\_INV}$ of the output-period control signal $BCN_{SYNC}$. The AND gate 430 is configured to generate a bypass control signal $BYP_{CTRL}$ (e.g., the switch signal SW in FIG. 2) according to the beacon BCN and the inversion $BCN_{SYNC\_INV}$. The bypass control signal $BYP_{CTRL}$ is used for controlling the conduction state of the bypass circuit 120.

It is noted that a patent application "signal generating circuit" filed in Taiwan (R.O.C.) on 2022 Jul. 5 describes the implementation of the synchronization circuit 410 for synchronizing the clock signal CLK with the output signal $S_{OUT}$, but this falls beyond the scope of the present disclosure.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the signal transmission device of the present disclosure can stabilize the initial output of an output signal through the introduction of a bypass circuit and the control thereof.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A signal transmission device having a stabilization mechanism for stabilizing an initial output of an output signal, the signal transmission device comprising:
    a driver including:
        a first current source circuit coupled between a high voltage terminal and a first node;
        a second current source circuit coupled between a low voltage terminal and a second node; and
        a driving circuit coupled between the first node and the second node, the driving circuit configured to output the output signal according to a first bias voltage of the first node, a second bias voltage of the second node, and an input signal during a signal output operation which starts before the driving circuit outputs the output signal; and
    a bypass circuit coupled between the first node and the second node and coupled with the driving circuit in parallel, wherein after the signal transmission device starts the signal output operation and before the driving circuit outputs the output signal, the bypass circuit is configured to be turned on to conduct a current from the first node to the second node and thereby assist in establishing the first bias voltage and the second bias voltage that are used for stabilizing the initial output of the output signal.

2. The signal transmission device of claim 1, wherein before the signal transmission device starts the signal output operation and after the driving circuit outputs the output signal, the bypass circuit is configured to be turned off.

3. The signal transmission device of claim 1, wherein before the signal transmission device starts the signal output operation, the first current source circuit is configured to make a first current path between the high voltage terminal and the first node nonconducting; before the signal transmission device starts the signal output operation, the second current source circuit is configured to make a second current path between the low voltage terminal and the second node nonconducting; after the signal transmission device starts the signal output operation, the first current source circuit is configured to make the first current path conducting; and after the signal transmission device starts the signal output operation, the second current source circuit is configured to make the second current path conducting.

4. The signal transmission device of claim 1, wherein the input signal is a differential input signal, the output signal is a differential output signal, and the driving circuit includes:
    a first inverting circuit configured to receive a first input signal of the differential input signal at a first input terminal and output a second output signal of the differential output signal at a first output terminal;
    a second inverting circuit configured to receive a second input signal of the differential input signal at a second input terminal and output a first output signal of the differential output signal at a second output terminal; and
    a resistance circuit coupled between the first output terminal and the second output terminal.

5. The signal transmission device of claim 1, wherein the bypass circuit includes M bypass path(s), each of the M bypass path(s) is coupled between the first node and the second node and includes at least one switch which is turned on or turned off according to a switch signal, and the M is a positive integer.

6. The signal transmission device of claim 5, wherein the M is greater than one, and the M bypass paths are coupled in parallel.

7. The signal transmission device of claim 5, wherein the at least one switch includes a first switch and a second switch coupled in series, the first switch is controlled by the switch signal to be turned on or turned off, the second switch is controlled by an inversion of the switch signal to be turned on or turned off, the first switch is an NMOS transistor, and the second switch is a PMOS transistor.

8. The signal transmission device of claim 5, wherein the signal transmission device is configured to start the signal output operation according to a beacon, the signal transmission device is configured to determine a signal output period according to the beacon, the bypass circuit is configured to be turned on during a specific period, and the specific period starts after the signal transmission device receives the beacon and ends before the signal output period starts.

9. The signal transmission device of claim 8, wherein the specific period is predetermined duration starting from a time point of the signal transmission device receiving the beacon, and the predetermined duration is fixed or adjustable.

10. The signal transmission device of claim 9, further comprising a bypass control circuit, wherein the bypass control circuit includes:
    a delay circuit configured to delay the beacon for the predetermined duration and thereby generate an output-period control signal for controlling the signal output period;
    an inverter configured to generate an inversion of the output-period control signal; and
    an AND gate configured to generate the switch signal according to the beacon and the inversion of the output-period control signal, wherein the switch signal is for controlling a conduction state of the bypass circuit.

11. The signal transmission device of claim 8, wherein the signal transmission device receives the beacon at a first time point, the signal output period starts at a second time point, and the specific period is between the first time point and the second time point.

12. The signal transmission device of claim 11, further comprising a bypass control circuit, wherein the bypass control circuit includes:
    a synchronization circuit configured to generate an output-period control signal according to the beacon, a clock signal, and a predetermined frequency of the output signal, wherein the output-period control signal is for determining the signal output period;
    an inverter configured to generate an inversion of the output-period control signal; and
    an AND gate configured to generate the switch signal according to the beacon and the inversion of the output-period control signal, wherein the switch signal is for controlling a conduction state of the bypass circuit.

13. The signal transmission device of claim 1, wherein the signal transmission device is configured to start the signal output operation according to a beacon, the signal transmission device is configured to determine a signal output period according to the beacon, the bypass circuit is configured to be turned on during a specific period, and the specific period starts after the signal transmission device receives the beacon and ends before the signal output period starts.

14. The signal transmission device of claim 13, wherein the specific period is predetermined duration starting from a time point of the signal transmission device receiving the beacon, and the predetermined duration is fixed or adjustable.

15. The signal transmission device of claim 14, further comprising a bypass control circuit, wherein the bypass control circuit includes:
   a delay circuit configured to delay the beacon for the predetermined duration and thereby generate an output-period control signal for controlling the signal output period;
   an inverter configured to generate an inversion of the output-period control signal; and
   an AND gate configured to generate a bypass control signal according to the beacon and the inversion of the output-period control signal, wherein the bypass control signal is for controlling a conduction state of the bypass circuit.

16. The signal transmission device of claim 13, wherein the signal transmission device receives the beacon at a first time point, the signal output period starts at a second time point, and the specific period is between the first time point and the second time point.

17. The signal transmission device of claim 16, further comprising a bypass control circuit, wherein the bypass control circuit includes:
   a synchronization circuit configured to generate an output-period control signal according to the beacon, a clock signal, and a predetermined frequency of the output signal, wherein the output-period control signal is for determining the signal output period;
   an inverter configured to generate an inversion of the output-period control signal; and
   an AND gate configured to generate a bypass control signal according to the beacon and the inversion of the output-period control signal, wherein the bypass control signal is for controlling a conduction state of the bypass circuit.

* * * * *